US012798466B2

(12) United States Patent
Roberts

(10) Patent No.: US 12,798,466 B2
(45) Date of Patent: Nov. 17, 2026

(54) ADJUSTABLE LATERAL RETRIEVER FOR A RECOVERY TOW TRUCK

(71) Applicant: Donald D. Roberts, Bean Station, TN (US)

(72) Inventor: Donald D. Roberts, Bean Station, TN (US)

( * ) Notice: Subject to any disclaimer, the term of this patent is extended or adjusted under 35 U.S.C. 154(b) by 240 days.

(21) Appl. No.: 18/936,018

(22) Filed: Nov. 4, 2024

(65) Prior Publication Data

US 2026/0124980 A1 May 7, 2026

(51) Int. Cl.
*B60P 3/12* (2006.01)
*B60P 1/54* (2006.01)

(52) U.S. Cl.
CPC ............... *B60P 3/12* (2013.01); *B60P 1/5423* (2013.01)

(58) Field of Classification Search
CPC B60P 3/12; B60P 3/125; B60P 1/5471; B60P 1/5423; B66C 23/44; B66C 23/42
See application file for complete search history.

(56) References Cited

U.S. PATENT DOCUMENTS 8,192,135 B2 6/2012 Ceccarelli et al.
8,360,706 B2 1/2013 Addleman et al.
8,540,475 B2 9/2013 Kuriakose et al.
9,555,733 B2 * 1/2017 Roberts .................... B60P 3/12
10,953,782 B2 3/2021 Jaeger
2004/0228714 A1 * 11/2004 Ceccarelli ................ B60P 3/12 414/563
2006/0133916 A1 * 6/2006 Wood .................... B60P 1/5471 414/539
2009/0263222 A1 * 10/2009 Kuriakose ................ B60P 3/12 414/563
2011/0204305 A1 * 8/2011 Ceccarelli ................ B60P 3/12 254/326
2012/0269609 A1 * 10/2012 Ceccarelli ................ B60P 3/12 414/563
2014/0252285 A1 * 9/2014 Genoe .................... B66C 23/44 254/280
2022/0274811 A1 9/2022 Jaeger

OTHER PUBLICATIONS

Gizmoplans, Hydraulic Outriggers, 2025 Gizmo Plans, available at https://www.gizmoplans.com/product/hydraulic-outriggers.

* cited by examiner

*Primary Examiner* — Kaitlin S Joerger
(74) *Attorney, Agent, or Firm* — ALLEN, DYER, DOPPELT + GILCHRIST, P.A.

(57) ABSTRACT

An adjustable lateral retriever for a recovery tow truck includes a lower cross member, an upper cross member, a first sheeve mounted to a first end of the upper cross member, and a second sheeve mounted to an opposing second end of the upper cross member. The retriever also includes a pair of adjustable vertical supports secured to the lower cross member and extending substantially perpendicular from the lower cross member. A first winch is mounted to a lower end of the first vertical support, and a second winch is mounted to a lower end of the second vertical support. In addition, a first winch cable is secured to the first winch and routed through the first sheeve, and a second winch cable secured to the second winch and routed through the second sheeve, where the winch cables are configured to attach to a vehicle to be recovered.

20 Claims, 6 Drawing Sheets

ADJUSTABLE LATERAL RETRIEVER FOR A RECOVERY TOW TRUCK

FIELD

The present invention relates to the field of recovery vehicles, and, more particularly, to an adjustable lateral retriever for a recovery tow truck.

BACKGROUND

A side puller tow truck, also known as a side recovery tow truck or a side pull wrecker, is a specialized type of tow truck designed for recovering vehicles that are overturned or stuck in a position where traditional towing methods might not be feasible.

These trucks are equipped with a boom or winch system mounted on the side of the vehicle, allowing them to approach the stranded vehicle from the side rather than from the rear or front like traditional tow trucks. This side-mounted system enables them to recover vehicles in tight spaces or difficult angles, such as along narrow roadsides or in ditches.

Side puller tow trucks are commonly used by towing and recovery services, as well as emergency responders, to safely and efficiently recover vehicles involved in accidents or off-road incidents. They provide versatility and enhanced capabilities for handling challenging recovery situations.

The side puller tow truck positions itself parallel to the stranded vehicle, aligning the side-mounted winch or boom with the vehicle that needs to be recovered. The operator extends the winch cable or boom arm from the side of the tow truck and attaches it securely to the stranded vehicle. Depending on the situation, the attachment point could be a designated recovery point on the vehicle or another secure location. Once the attachment is made, the winch system on the side puller tow truck begins to retract the cable, applying tension to the stranded vehicle. This process gradually pulls the vehicle closer to the tow truck.

Depending on the situation and the configuration of the tow truck, the stranded vehicle may be lifted slightly off the ground as it is pulled towards the tow truck. In some cases, the vehicle may be dragged along the ground if lifting is not necessary or feasible. Once the stranded vehicle is brought into a suitable position, it can be further secured if necessary, and the tow truck operator can prepare it for transport. This may involve additional attachments or preparations to ensure the vehicle is stable and secure during transportation. After the vehicle is successfully recovered, the side puller tow truck can transport it to a desired location, such as a repair facility or a designated storage area. Depending on the size and weight of the vehicle, additional precautions may be taken during transportation to ensure safety and stability.

However, there is a need for improvements to handle heavier loads and provide better control over the recovery process and enhance the stability of the tow truck during side pulling operations, especially when dealing with heavy or unstable vehicles.

SUMMARY

An adjustable lateral retriever for a recovery tow truck is disclosed. The adjustable lateral retriever includes a lower cross member having a first end and an opposing second end, where the lower cross member is configured to be coupled to frame rails of the recovery tow truck. The lateral retriever also includes an upper cross member having a first end and an opposing second end, a first sheeve mounted to the first end of the upper cross member, and a second sheeve mounted to the opposing second end of the upper cross member. A first adjustable vertical support is secured to the first end of the lower cross member and extends substantially perpendicular from the lower cross member to the first end of the upper cross member, and a second adjustable vertical support is secured proximate to the second end of the lower cross member and extends substantially perpendicular from the lower cross member to the send end of the upper cross member. The lateral retriever includes a first winch mounted to a lower end of the first vertical support, a second winch mounted to a lower end of the second vertical support, and a first winch cable secured to the first winch and routed through the first sheeve. The first winch cable is configured to attach to a vehicle to be recovered. In addition, a second winch cable is secured to the second winch and routed through the second sheeve, where the second winch cable is also configured to attach to the vehicle to be recovered.

The first and second adjustable vertical supports are configured to raise and lower relative to the lower cross member to provide increased visibility from out of back glass of the recovery tow truck. The first and second winches are configured to be mounted below a bed of the recovery tow truck when installed so that the first and second adjustable vertical supports can be raised or lowered without interfering with an operation of the first and second winches.

The lateral retriever may also include a first self-adjusting stabilizer leg and a second self-adjusting stabilizer leg mounted to respective frame rails of the recovery tow truck, where the first and second self-adjusting stabilizers are configured to self-adjust to uneven terrain when deployed.

Each of the first and second self-adjusting stabilizer legs includes a bracket for securing to a respective frame rail, a support member having a first end pinned to the bracket, an extension slidingly engaged with the support member, a hydraulic cylinder having a first end pinned to the bracket and a second end pinned to the extension, and a hydraulic line secured to the hydraulic cylinder and configured to provide hydraulic pressure to extend and retract the hydraulic cylinder that in turn extends and retracts the extension to stabilize the recovery tow truck during recovery operations. A first support foot may be pinned to a distal end of the first extension, and a second support foot pinned to a distal end of the second extension.

The lateral retriever may also include a hydraulic pump in fluid communication with the hydraulic cylinder, and a light bar secured to the upper cross member.

In addition, the lateral retriever may include a first mounting bracket secured to the lower end of the first adjustable vertical support and the lower cross member, and a second mounting bracket secured to the second adjustable vertical support and the lower cross member, where the first and second mounting brackets are configured to be secured to the respective frame rails of the recovery tow truck.

In another aspect, a method of using an adjustable lateral retriever for a recovery tow truck is disclosed. The method includes extending a first winch cable routed through a first sheeve mounted to a first end of an upper cross member, or extending a second winch cable routed through a second sheeve mounted to an opposing second end of the upper cross member. The method also includes attaching either the first or second winch cable to a vehicle to be recovered, and extending at least one self-adjusting stabilizer. In addition, the method includes activating a first winch mounted below a bed of the tow recovery vehicle and having the first winch cable, or engaging a second winch mounted below the bed of the tow recovery vehicle and having the second winch cable, and pulling the vehicle towards the recovery tow truck by engaging a respective winch.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
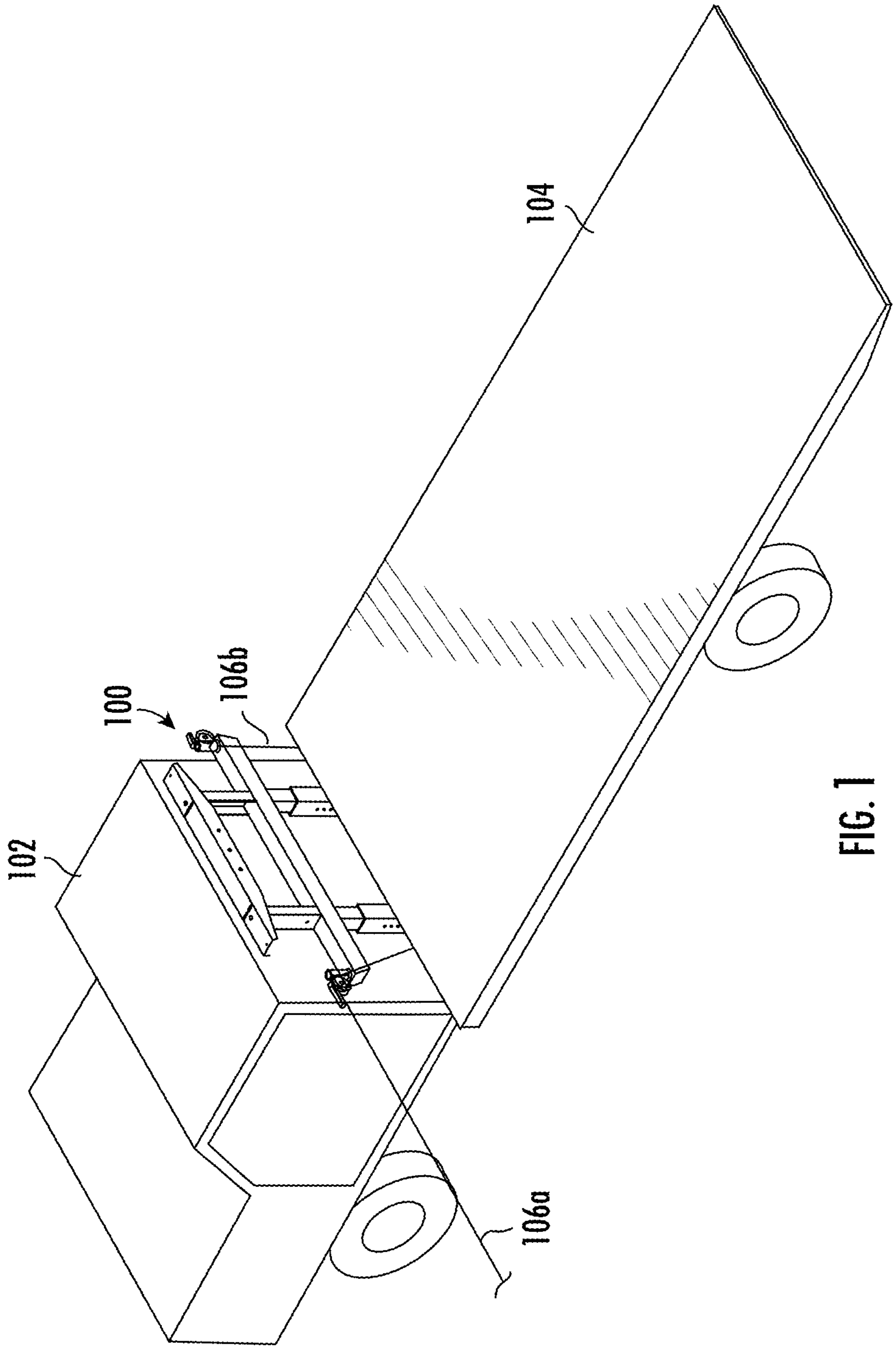
FIG. 1 is a perspective view of an adjustable lateral retriever for a recovery tow truck in accordance with the present disclosure.

Referring now to FIG. 1, a lateral retriever for a recovery tow truck is depicted and generally designated 100. The lateral retriever 100 is mounted behind a cab of the recovery tow truck 102. The recovery tow truck 102 includes a bed 104 that is configured to slide back and down to the ground to load a vehicle. A first winch cable 106*a* and a second winch cable 106*b* can be deployed from either side of the lateral retriever 100 to recover a vehicle. In addition, a first winch cable 106*a*, or vice versa, is configured to secure to the vehicle to be recovered and the second winch cable 106*b* is configured to be anchored to a tree or other object to provide stability when recovering the vehicle.

Figure 2:
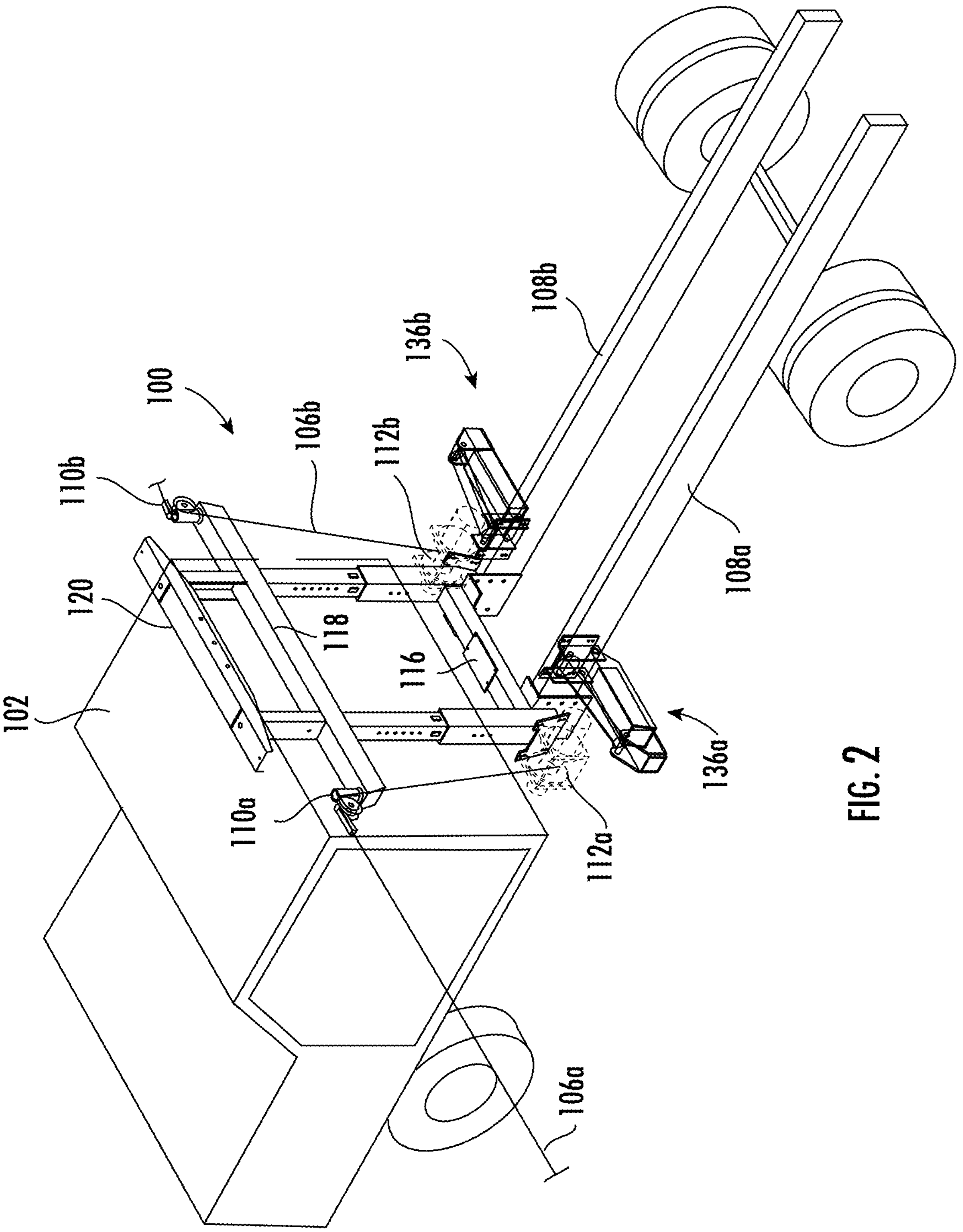
FIG. 2 is a perspective view of the adjustable lateral retriever of FIG. 1, with the bed of the recovery tow truck removed for clarity.

The recovery tow truck 102 is shown without the bed 104 in FIG. 2, for clarity. The lateral retriever 100 includes a lower cross member 116 having a first end and an opposing second end. The lower cross member 116 is configured to be coupled to frame rails 108*a*, 108*b* of the recovery tow truck 102. The lateral retriever 100 also includes an upper cross member 118 having a first end and an opposing second end. A first sheeve 110*a* is mounted to the first end of the upper cross member 118, and a second sheeve 110*b* is mounted to the opposing second end of the upper cross member 118.

Figure 3:
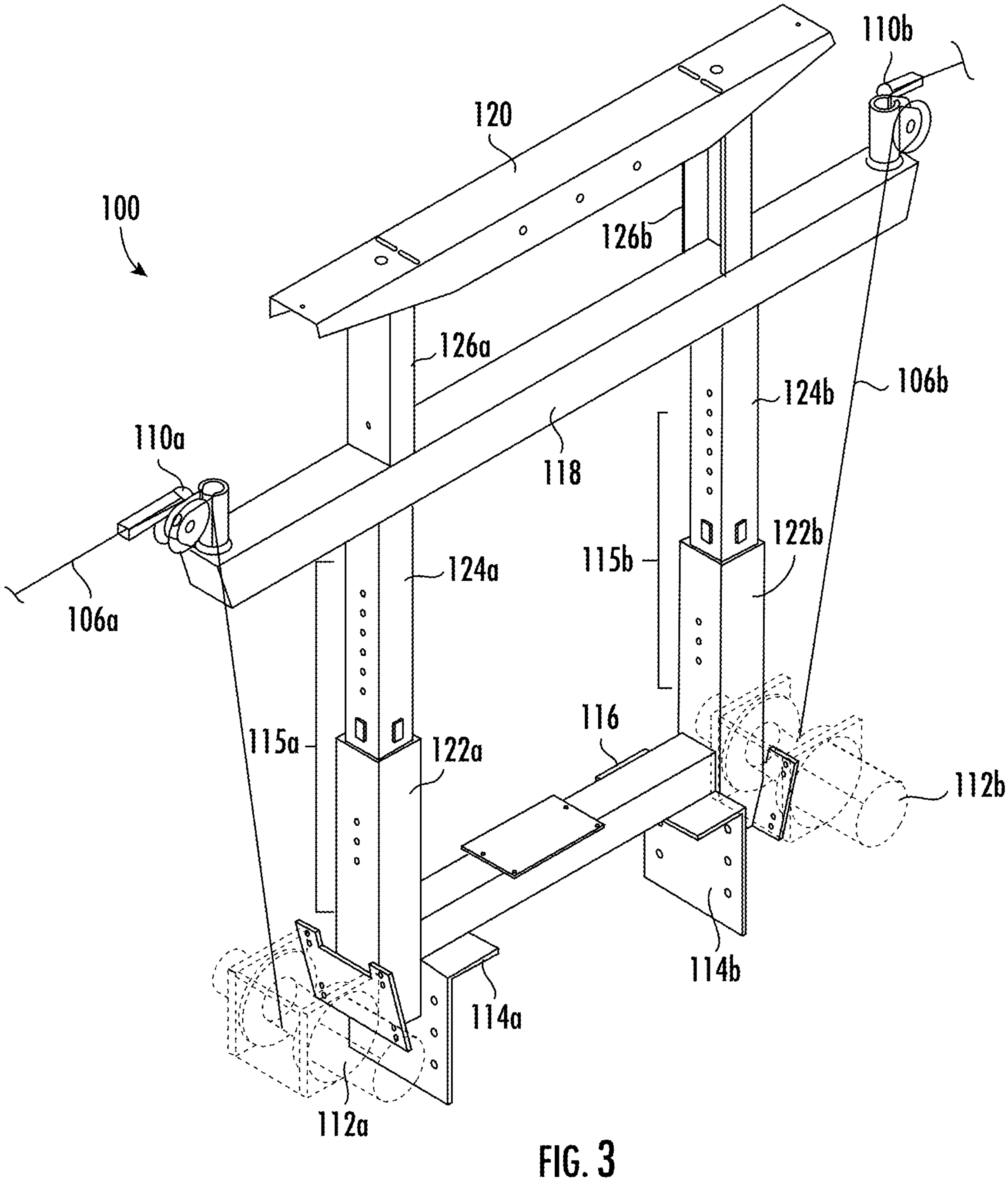
FIG. 3 is a perspective view of the adjustable lateral retriever in a raised position.
Figure 4:
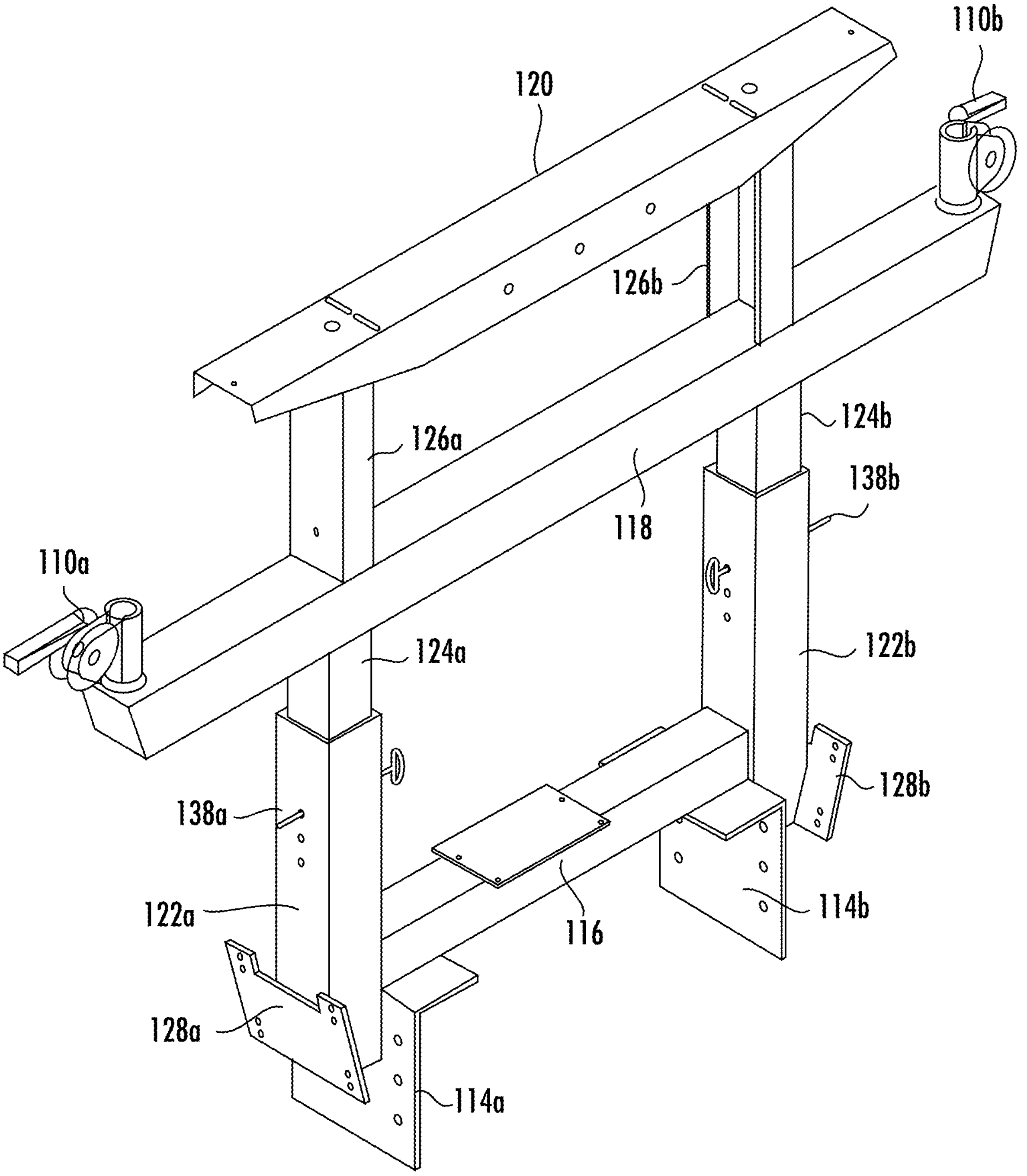
FIG. 4 is a perspective view of the adjustable lateral retriever in a lowered position.

Referring not to FIGS. 3 and 4, a first adjustable vertical support 122*a* is secured to the first end of the lower cross member 116 and extends substantially perpendicular from the lower cross member 116 to the first end of the upper cross member 118. A second adjustable vertical support 122*b* is secured proximate to the second end of the lower cross member 116 and extends substantially perpendicular from the lower cross member to the second end of the upper cross member 118. The first and second adjustable vertical supports 115*a*, 115*b* are configured to raise and lower the upper cross member 118 relative to the lower cross member 116 to provide increased visibility from out of the back glass of the recovery tow truck 102.

The first and second adjustable vertical supports 115*a*, 115*b* include a respective sleeve 122*a*, 122*b* that is secured to the lower cross member 116 and extends substantially perpendicular from the lower cross member to the upper cross member 118. A vertical column 124*a*, 124*b* slidingly engages within the respective sleeve 122*a*, 122*b* and is configured to extend out from the sleeve to adjust a height of upper cross member 118. The sleeves 122*a*, 122*b* and vertical columns 124*a*, 124*b* each have apertures that are configured for a respective pin 138*a*, 138*b* to slide through to maintain the desired height of the upper cross member 118.

A first winch 112*a* is mounted to a lower end of the first vertical support 115*a* on a first mounting plate 128*a*, and a second winch 112*b* is mounted to a lower end of the second vertical support 115*b* on a second mounting plate 128*b*. The first winch cable 106*a* is secured to the first winch 112*a* and routed through the first sheeve 110*a*, where the first winch cable 106*a* is configured to be attached to the vehicle to be recovered. Similarly, a second winch cable 106*b* is secured to the second winch 112*b* and routed through the second sheeve 110*b* and the second winch cable 106*b* is also configured to attach to the vehicle to be recovered when on the other side of the recovery tow truck 102.

The first and second winches 112*a*, 112*b* are mounted below the bed 104 of the recovery tow truck 102 when installed so that the first and second adjustable vertical supports 115*a*, 115*b* can be raised or lowered without interfering with an operation of the first and second winches.

The lateral retriever 100 also includes a light bar 120 that is mounted to the upper cross member 118 and is used to mount lights that are used during recovery operations. The adjustable lateral retriever 100 includes a first mounting bracket 114*a* that us secured to the lower end of the first adjustable vertical support 115*a* and the lower cross member 116, and a second mounting bracket 114*b* that is secured to the second adjustable vertical support 115*b* and the lower cross member 116. The first and second mounting brackets 114*a*, 114*b* are secured to the respective frame rails 108*a*, 108*b* of the recovery tow truck 102 using bolts or welds, for example.

Figure 5A:
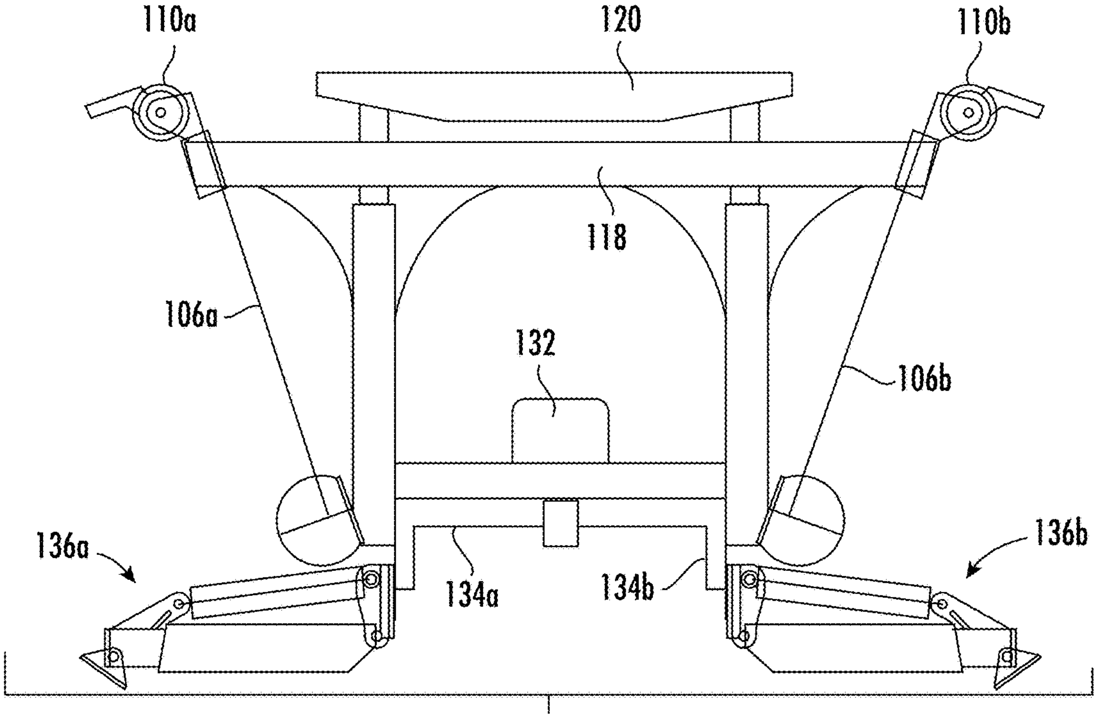
FIG. 5*a* is a front view of self-adjusting stabilizer legs.
Figure 5B:
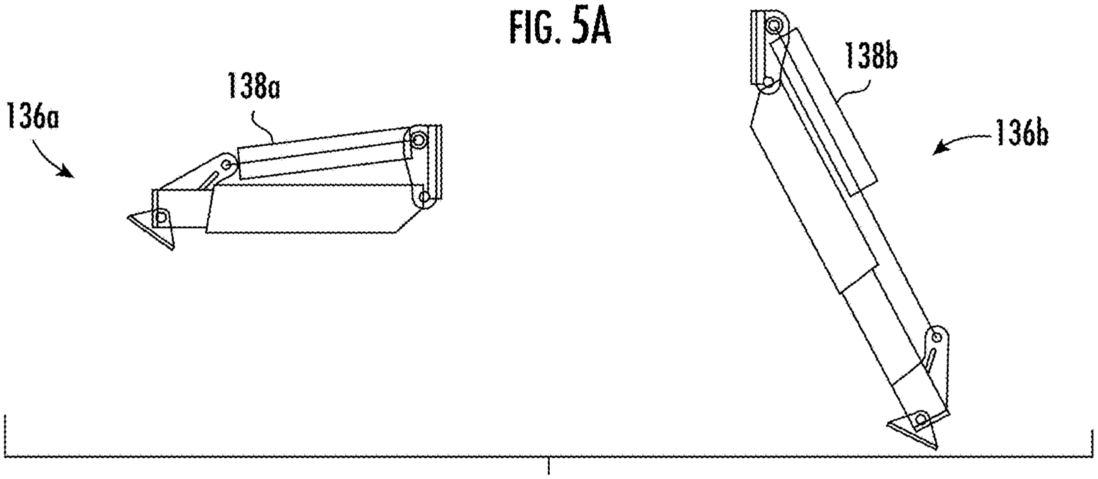
FIG. 5*b* depicts the self-adjusting stabilizer legs being deployed.
Figure 5C:
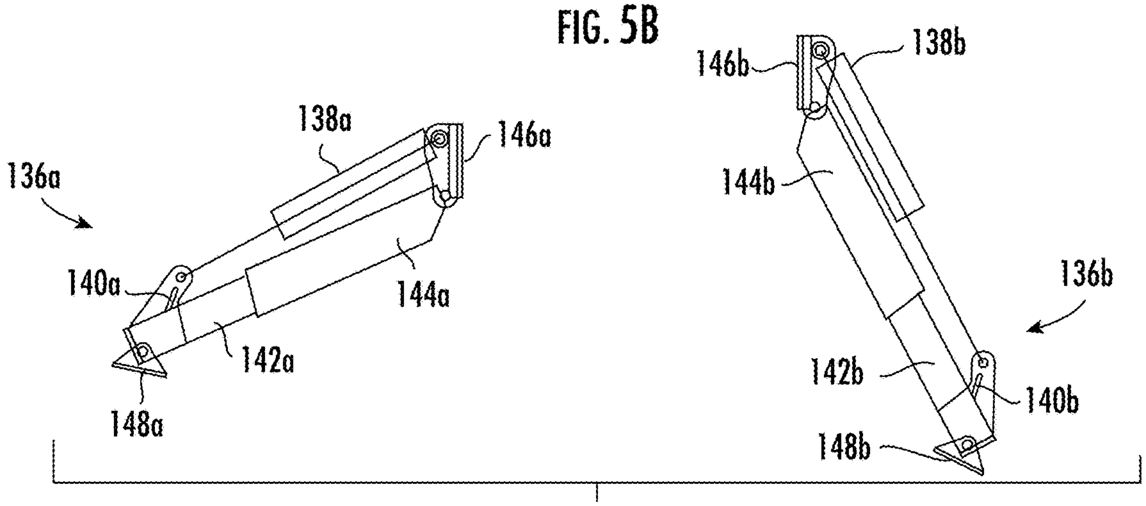
FIG. 5*c* depicts the self-adjusting stabilizer legs fully deployed.

Referring now to FIG. 5*a*, the lateral retriever 100 includes a first self-adjusting stabilizer leg 136*a* and a second self-adjusting stabilizer leg 136*b* mounted to respective frame rails 108*a*, 108*b* of the recovery tow truck 102. The first and second self-adjusting stabilizers 108*a*, 108*b* are configured to self-adjust to uneven terrain when deployed as shown in FIGS. 5*b* and 5*c*.

Figure 6:
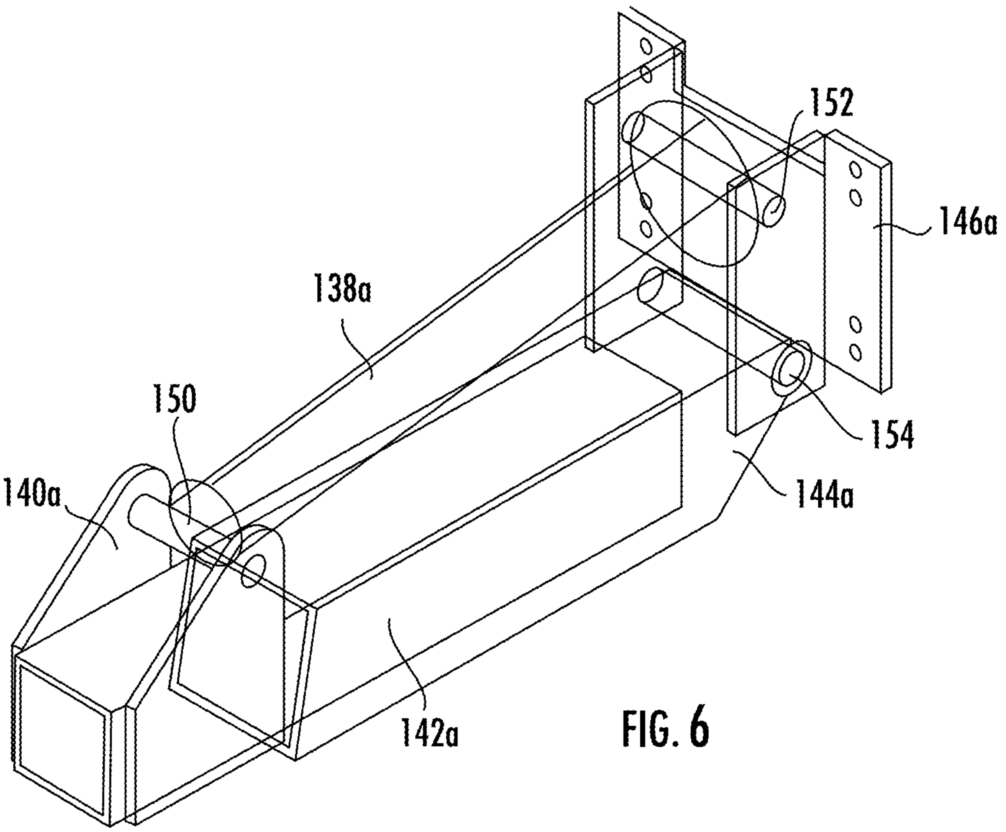
FIG. 6 is front perspective view of the self-adjusting stabilizer leg.
Figure 7:
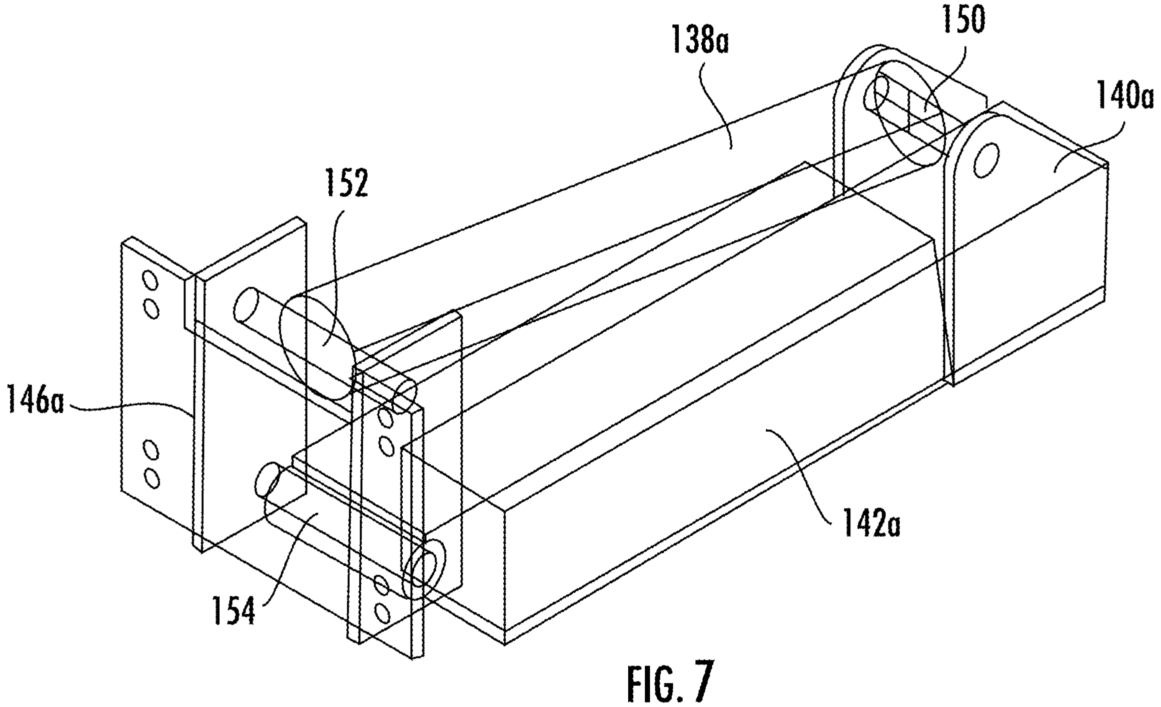
FIG. 7 is a rear perspective view of the self-adjusting stabilizer leg.

The first and second self-adjusting stabilizer legs 136*a*, 136*b* include a respective bracket 146*a*, 146*b* for securing to a respective frame rail 108*a*, 108*b*. The stabilizer legs 136*a*, 136*b* include a support member 144*a*, 144*b* that has a first end pinned to the respective bracket 146*a*, 146*b* by pins 154, and an extension 142*a*, 142*b* that is slidingly engaged with the respective support member 144*a*, 144*b*, as depicted in FIGS. 6 and 7. Each of the stabilizer legs 136*a*, 136*b* has a hydraulic cylinder 138*a*, 138*b* that has a first end pinned to the respective bracket 146*a*, 146*b* by pins 152 and second end pinned to the respective second ends 140*a*, 140*b* of the extensions 142*a*, 142*b* by pins 150.

A hydraulic line 134*a*, 134*b* is secured to the respective hydraulic cylinder 138*a*, 138*b* to provide hydraulic pressure in order to extend and retract the hydraulic cylinder that in turn extends and retracts the respective extension 142*a*, 142*b* to stabilize the recovery tow truck 102 during recovery operations. A hydraulic pump 132 is in fluid communication with the hydraulic cylinders 138*a*, 138*b* to generate the hydraulic pressure needed to extend and retract the hydraulic cylinders 138*a*, 138*b*. Each of the extensions 142*a*, 142*b* includes an adjustable foot 148*a*, 148*b* that rotates to match the terrain and provide solid footing.

In operation of the lateral retriever 100, the driver of the recovery tow truck 102 aligns the lateral retriever alongside the vehicle that is to be recovered from a ditch or other inaccessible location. If the vehicle to be recovered is on the driver's side of the recovery tow vehicle 102, for example, then the first winch cable 106*a* is pulled from first winch 112*a* as it is routed through the first sheeve 110. The end of the first winch cable 106*a* is secured to the vehicle to be recovered. In addition, the self-adjusting stabilizers 136*a*, 136*b* are deployed. The first winch 112*a* mounted below the bed of the tow recovery vehicle 102 is then activated and pulls the vehicle towards the recovery tow truck 102 and out of the ditch or other inaccessible location until the vehicle is situated so the recovery tow truck can load the vehicle on to the bed 104.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An adjustable lateral retriever for a recovery tow truck, the adjustable lateral retriever comprising:

a lower cross member having a first end and an opposing second end, the lower cross member configured to be coupled to frame rails of the recovery tow truck;

an upper cross member having a first end and an opposing second end;

a first sheeve mounted to the first end of the upper cross member;

a second sheeve mounted to the opposing second end of the upper cross member;

a first adjustable vertical support secured to the first end of the lower cross member and extending substantially perpendicular from the lower cross member to the first end of the upper cross member;

a second adjustable vertical support secured proximate to the second end of the lower cross member and extending substantially perpendicular from the lower cross member to the second end of the upper cross member;

a first winch mounted to a lower end of the first vertical support;

a second winch mounted to a lower end of the second vertical support;

a first winch cable secured to the first winch and routed through the first sheeve, the first winch cable configured to attach to a vehicle to be recovered; and a second winch cable secured to the second winch and routed through the second sheeve, the second winch cable configured to attach to the vehicle to be recovered.

2. The adjustable lateral retriever of claim 1, wherein the first and second adjustable vertical supports are configured to raise and lower relative to the lower cross member to provide increased visibility from out of back glass of the recovery tow truck.

3. The adjustable lateral retriever of claim 1, wherein the first and second winches are configured to be mounted below a bed of the recovery tow truck when installed so that the first and second adjustable vertical supports can be raised or lowered without interfering with an operation of the first and second winches.

4. The adjustable lateral retriever of claim 1, further comprising a first self-adjusting stabilizer leg and a second self-adjusting stabilizer leg mounted to respective frame rails of the recovery tow truck, the first and second self-adjusting stabilizers are configured to self-adjust to uneven terrain when deployed.

5. The adjustable lateral retriever of claim 4, wherein each of the first and second self-adjusting stabilizer legs comprises, a bracket for securing to a respective frame rail;

a support member having a first end pinned to the bracket;

an extension slidingly engaged with the support member;

a hydraulic cylinder having a first end pinned to the bracket and a second end pinned to the extension; and a hydraulic line secured to the hydraulic cylinder and configured to provide hydraulic pressure to extend and retract the hydraulic cylinder that in turn extends and retracts the extension to stabilize the recovery tow truck during recovery operations.

6. The adjustable lateral retriever of claim 5, further comprising a hydraulic pump in fluid communication with the hydraulic cylinder.

7. The adjustable lateral retriever of claim 1, further comprising a light bar secured to the upper cross member.

8. The adjustable lateral retriever of claim 1, further comprising a first mounting bracket secured to the lower end of the first adjustable vertical support and the lower cross member, and a second mounting bracket secured to the second adjustable vertical support and the lower cross member, the first and second mounting brackets configured to be secured to the respective frame rails of the recovery tow truck.

9. The adjustable lateral retriever of claim 5, further comprising a first support foot pinned to a distal end of the first extension, and a second support foot pinned to a distal end of the second extension.

10. An adjustable lateral retriever for a recovery tow truck, the adjustable lateral retriever comprising:

a lower cross member having a first end and an opposing second end, the lower cross member configured to be coupled to frame rails of the recovery tow truck;

a first sleeve secured to the first end of the lower cross member and extending substantially perpendicular from the lower cross member;

a second sleeve secured proximate to the second end of the lower cross member and substantially perpendicular from the lower cross member;

a first vertical column having a lower end and an upper end, the first vertical column slidingly engaged within the first sleeve and configured to extend out from the first sleeve;

a second vertical column having a lower end and an upper end, the second vertical column slidingly engaged within the second sleeve and configured to extend out from the second sleeve;

an upper cross member having a first end and an opposing second end, the upper ends of the first and second vertical columns fixed to the upper cross member, wherein the first and second vertical columns are vertically adjustable relative to the lower cross member;

a first winch mounted to the lower end of the first sleeve and configured to be positioned below a bed of the recovery tow truck when installed;

a second winch mounted to the lower end of the second sleeve and configured to be positioned below the bed of the recovery tow truck when installed;

a first sheeve mounted to the first end of the upper cross member;

a second sheeve mounted to the opposing second end of the upper cross member;

a first winch cable secured to the first winch and routed through the first sheeve, the first winch cable configured to attach to a vehicle to be recovered; and a second winch cable secured to the second winch and routed through the second sheeve, the second winch cable configured to attach to the vehicle to be recovered.

11. The adjustable lateral retriever of claim 10, further comprising a first self-adjusting stabilizer leg and a second self-adjusting stabilizer leg mounted to the frame rails of the recovery tow truck.

12. The adjustable lateral retriever of claim 11, wherein each of the first and second self-adjusting stabilizer legs comprise, a bracket for securing to a respective frame rail;

a support member having a first end pinned to the bracket;

an extension slidingly engaged with the support member;

a hydraulic cylinder having a first end pinned to the bracket and a second end pinned to the extension; and a hydraulic line secured to the hydraulic cylinder and configured to provide hydraulic pressure to extend and retract the hydraulic cylinder that in turn extends and retracts the extension to stabilize the recovery tow truck during recovery operations.

13. The adjustable lateral retriever of claim 12, further comprising a hydraulic pump in fluid communication with the hydraulic cylinder.

14. A method of using an adjustable lateral retriever for a recovery tow truck, the adjustable lateral retriever comprising a lower cross member, an upper cross member, a first adjustable vertical support secured to a first end of the lower cross member and extending substantially perpendicular from the lower cross member, a second adjustable vertical support secured proximate to a second end of the lower cross member and substantially perpendicular from the lower cross member, the method comprising:

extending a first winch cable routed through a first sheeve mounted to a first end of the upper cross member, or extending a second winch cable routed through a second sheeve mounted to an opposing second end of the upper cross member;

attaching either the first or second winch cable to a vehicle to be recovered;

extending at least one self-adjusting stabilizer;

activating a first winch mounted below a bed of the tow recovery vehicle and having the first winch cable, or engaging a second winch mounted below the bed of the tow recovery vehicle and having the second winch cable; and pulling the vehicle towards the recovery tow truck by engaging a respective winch.

15. The method of claim 14, wherein the first and second adjustable vertical supports are configured to raise and lower relative to the lower cross member to provide increased visibility from out of back glass of the recovery tow truck.

16. The method of claim 14, wherein the first and second winches are mounted below the bed of the recovery tow truck when installed so that the first and second adjustable vertical supports can be raised or lowered without interfering with an operation of the first and second winches.

17. The method of claim 14, wherein the at least one self-adjusting stabilizer is configured to self-adjust to uneven terrain when deployed.

18. The method of claim 14, wherein the at least one self-adjusting stabilizer comprises, a bracket secured to a respective frame rail of the recovery tow truck;

a support member having a first end pinned to the bracket;

an extension slidingly engaged with the support member;

a hydraulic cylinder having a first end pinned to the bracket and a second end pinned to the extension; and a hydraulic line secured to the hydraulic cylinder and configured to provide hydraulic pressure to extend and retract the hydraulic cylinder that in turn extends and retracts the extension to stabilize the recovery tow truck during recovery operations.

19. The method of claim 18, further comprising a hydraulic pump in fluid communication with the hydraulic cylinder.

20. The method of claim 19, wherein the at least one self-adjusting stabilizer comprises a support foot pinned to a distal end of the second extension.

* * * * *